July 26, 1932.  T. L. FAWICK  1,869,097
CLUTCH ADJUSTMENT
Filed July 11, 1930
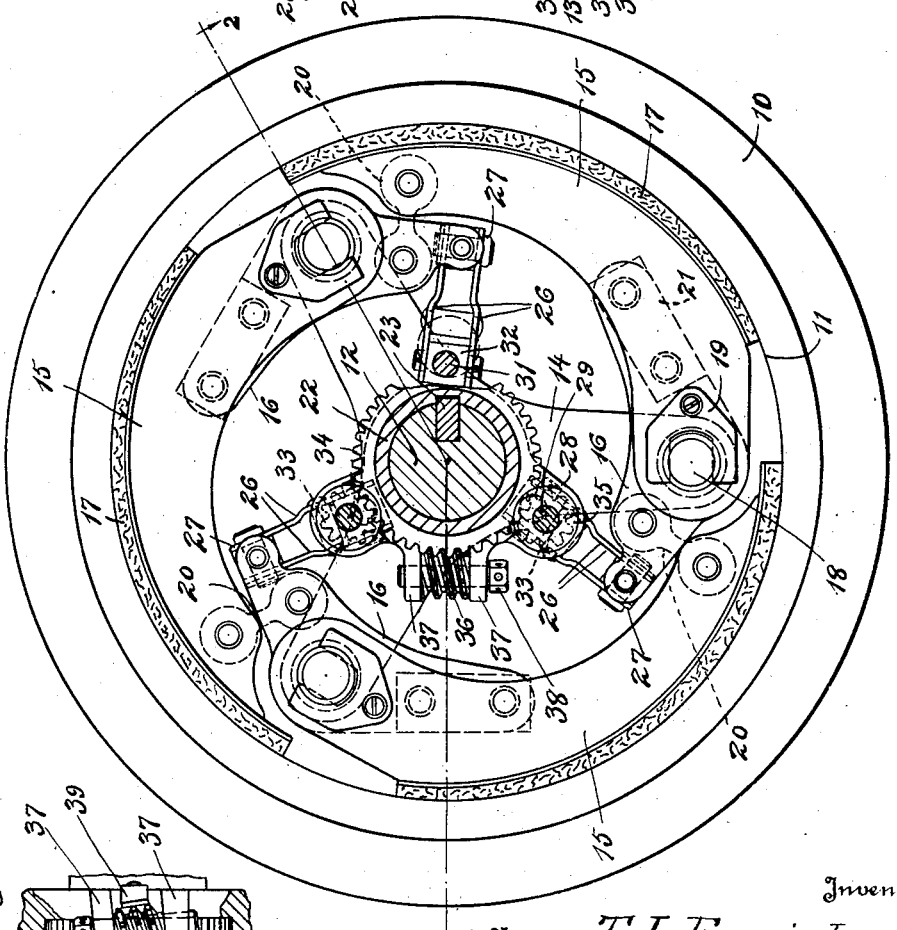
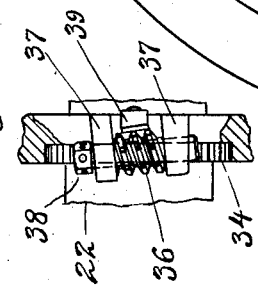
Inventor
T. L. Fawick,
By Robert M. Pierson,
Attorney Patented July 26, 1932

1,869,097

UNITED STATES PATENT OFFICE

THOMAS L. FAWICK, OF AKRON, OHIO, ASSIGNOR TO FAWICK MANUFACTURING COMPANY, OF WAUKESHA, WISCONSIN, A CORPORATION OF WISCONSIN

CLUTCH ADJUSTMENT

Application filed July 11, 1930. Serial No. 467,201.

This invention relates to friction clutches, and especially those of the radially-acting shoe type. Its main object is to provide an adjusting means which will avoid undue resistance to the operating movement of the parts, such as the clutch-setting collar which slides on the driven shaft, while permitting a powerful engagement of the gripping surfaces. Further objects are to provide a simple, compact, easily assembled, easily adjusted and durable clutch in which the radial thrusts of the operating links are balanced against each other.

While not wholly limited to a particular type of clutch, the invention may be advantageously employed in connection with clutches having radially-acting shoes operated through intermediate levers by rods or links which center on a control sleeve and are mounted for swinging movement in two planes respectively for operating and for adjusting the shoes. Heretofore I have proposed to mount such rods or links substantially in a tangent relation to the control sleeve, but it was found that in the larger sizes the reaction pressures on the links, tending to rotate said sleeve, were so great as to cause undue friction of the sleeve on its key or spline and thus to interfere with its free operation in setting and releasing the shoes. The present invention introduces a new mode of swinging the links to effect an adjustment of the shoes, which permits the links to stand in a more nearly radial position, thereby avoiding this difficulty.

Of the accompanying drawing,

Fig. 1 is a rear elevation, partly broken away and in section, showing a clutch embodying my present improvements in a preferred form.

Fig. 2 is a section on the line 2—2 of Fig. 1, partly in elevation.

Fig. 3 is a plan view of the adjusting worm and adjacent parts as viewed from the plane 3—3 of Fig. 2.

Referring to the drawing, 10 is a fly-wheel or driving member whose flange is formed with an internal, cylindrical friction surface 11. 12 is the driven shaft supported at its forward end in the web of the fly-wheel by a pilot ball-bearing 13. On the shaft 12 is keyed a three-armed spider 14 on which are pivoted the friction shoes 15 for engaging the fly-wheel driving surface 11, and a series of intermediate counterbalancing and power-multiplying, shoe-operating levers 16.

The U-shaped, sheet-metal shoe-bodies, to which are attached suitable asbestos composition facings 17, are made to straddle the spider arms whose extremities are formed with bearings for the pivot pins 18 of the shoes, said pins being detachably secured to the shoes, so as to turn therewith, by means of U-shaped retaining plates or keys 19 whose legs occupy chamfer grooves in the pins. The rear end of the pin bearing on each spider arm is externally formed as a journal or pivot for the lever 16 which operates the next-adjacent shoe 15 by connection through a link 20 with the free end of said shoe. The long arm of each lever, opposite the link 20, includes a weight 21, anchored by tie-rods connecting the side plates of the lever, for counteracting the effect of centrifugal force upon the shoe which is operated by said lever. The levers 16 lie on the rear side of the spider 14, between the side plates of the shoes 15.

22 is a clutch-operating sleeve splined by a groove and key 23 to slide longitudinally on the shaft 12 without turning thereon, and having a rear flange 24 embraced by a thrust collar 25. Said sleeve is pivotally connected with the inner ends of a series of three radially-disposed links or rods 26 whose outer ends are connected by universal pivot joints 27 with the arms of the respective levers 16 opposite the weights 21. The longitudinal movements of the sleeve 22 on shaft 12 produce swinging movements of the links 26 in planes parallel with said shaft, thus turning the levers 16 on their pivots and through the links 20 setting or releasing the clutch shoes 16. In this instance the links 26 are carried "over-center" to the position represented in Fig. 2 in the engaged condition of the clutch, but the familiar arrangement of clutch-setting spring or springs and clutch-releasing pedal or lever could be substituted.

The links 26 are also mounted for swinging movement in a transverse plane to effect the adjustment of the shoes 15 with reference to the fly-wheel flange surface 11 in order to attain a proper initial positioning of said shoes and compensate for wear of the friction surfaces. My present invention particularly consists in a novel means for producing this adjustment, of which I have herein illustrated a preferred form, now to be described.

In suitable bearing ears 28 projecting radially from the forward end of the sleeve 22 are journaled a series of three short shafts 29 each having its forward end formed with a crank 30 whose pin 31 is journaled in a bearing block 32 which is pivoted at the inner end of the corresponding link 26. To the rear end of each shaft 29 is affixed a gear pinion 33, the teeth of which mesh with those of a central gear 34 mounted to turn on sleeve 22 in the rear of the bearing ears 28. The gear 34 is retained against rearward axial movement on the sleeve, and the shafts 24 are retained against forward axial movement in their bearings, by means common to said gear and shaft, consisting of collars or washers 35, and nuts 135 locked on the shafts by cotter pins.

For rotating the gear 34 on the sleeve 22 I provide a worm 36 whose shaft is journaled in a pair of ears 37 projecting from one side of the sleeve and provided with a head 38 for turning it, the thread of said worm being notched and frictionally held against rotation by a spring check-pawl 39. By slanting the axis of worm 36 at a small angle to the plane of gear 34, equal to the pitch angle of said worm, as indicated in Fig. 3, the portions of its thread engaging the teeth of the gear, may be made to lie substantially parallel with said teeth, thus permitting the use of a spur gear for the worm gear and also for actuating the pinions 33.

In operation, the friction shoes 15 are set and released by forward and rearward movements of the sleeve 22, which is actuated through the collar 25 by a suitable lever or pedal, thereby causing the links 26 to swing fore-and-aft on the pivot joints 27 in approximately radial planes, and moving out or in the corresponding ends of the levers 16 and the shoes to which they are linked. When it is desired to change the clutch adjustment to compensate for wear or to vary the gripping pressure, this is simultaneously accomplished for all three of the shoes 15, in their released position, by the operator turning the worm 36, which causes a corresponding rotation of central gear 34 upon the sleeve 22 and of the pinions 33 and the shafts 29 within their bearings, thus rocking the cranks 30, swinging the crank-pins 31 inwardly or outwardly in separate arcuate paths of short radius eccentric to shaft 12, changing the radial positions of the inner ends of the links with reference to the sleeve 22 and hence altering the clearance between the shoe facings 17 and the driving surface 11.

In this way a very delicate and accurate adjustment is quickly and easily accomplished. The described arrangement permits the links 26, when the clutch is engaged, to stand substantially radial with respect to the shaft 12 and sleeve 22 at all positions of the adjusting devices and hence balances the thrusts of said links against each other through the medium of the cranks 30, their shafts and said sleeves 22 so that there will be no binding or cramping of the sleeve against its key 23, but said sleeve may at all times move freely on the driven shaft to operate the shoes.

Obviously, the number of the shoes, levers and links may be varied, the form of the described adjusting means may be changed without essentially altering its principle, and other modifications may be made within the scope of my invention as defined in the claims.

I claim:

1. In a friction clutch, the combination of a driven shaft, friction members, an operating sleeve on said shaft, operating thrust links, gear pinions on said sleeve for moving the inner ends of said links away from and transversely of the axis of rotation, and a central adjusting gear on said sleeve parallel and meshing with said pinions.

2. In a friction clutch, the combination of friction elements, a series of thrust links therefor having swinging operating movements longitudinally of the axis of rotation, and combined adjusting movements transversely of said axis and endwise of the links, individual adjusting cranks connected with the ends of said links, for imparting said adjusting movements, and a common adjusting means for said cranks.

3. In a friction clutch, the combination of friction elements, a series of radial thrust links therefor, means for imparting clutch-operating movements to said links, individual cranks connected with the inner ends of said links for adjusting them to vary the maximum clearance of the friction elements, gear pinions for turning said cranks, and a central gear for rotating said pinions.

4. In a friction clutch, the combination of friction elements, thrust devices therefor, means for imparting operating movements to said thrust devices, gear pinions for adjusting said thrust devices, a manual adjusting worm, and an adjusting gear common to said worm and said gear pinions.

5. In a friction clutch, the combination of friction elements, an intermeshing gear and a pinion parallel therewith for adjusting said elements, and means coaxial and turning with said pinion and overlapping the gear for retaining them against axial displacement in opposite directions.

6. In a friction clutch, the combination of a driven shaft having a shoe support, friction shoes mounted on said support, thrust links for operating said shoes, a slidable sleeve for swinging said links, individual shafts rotatably supported on said sleeve and having cranks at their forward ends for moving said links to adjust the shoes, and gear pinions at their rear ends, a central gear mounted to turn on said sleeve for rotating the gear pinions, and means on said individual shafts, overlapping said central gear, for retaining the latter and the shafts against opposite endwise displacement.

7. In a friction clutch, the combination of a rotary driven support, a friction shoe carried thereby, a thrust link for operating said shoe, said link having an independent shoe-adjusting movement transverse to the axis of rotation of the clutch, and means movable in a transverse arcuate path eccentric to said axis for imparting the adjusting movement to said link.

8. In a friction clutch, the combination of friction elements, a series of substantially radial links having their thrusts substantially balanced against each other and mounted for swinging operating movement longitudinally of the axis of rotation and for adjusting movement transversely of said axis and longitudinally of the links, an axially movable central element for collectively imparting the operating movement to the links, and rotary means on said element for collectively imparting the adjusting movement to the links.

In witness whereof I have hereunto set my hand this 5th day of July, 1930.

THOMAS L. FAWICK.